United States Patent
Perkins et al.

[11] Patent Number: 6,122,103
[45] Date of Patent: Sep. 19, 2000

[54] BROADBAND WIRE GRID POLARIZER FOR THE VISIBLE SPECTRUM

[75] Inventors: Raymond T. Perkins, Orem; Douglas P. Hansen, Spanish Fork; Eric W. Gardner; James M. Thorne, both of Provo; Arthur A. Robbins, Orem, all of Utah

[73] Assignee: Moxtech, Orem, Utah

[21] Appl. No.: 09/337,970

[22] Filed: Jun. 22, 1999

[51] Int. Cl.[7] .................................................... G02B 5/30
[52] U.S. Cl. ............................................ 359/486; 362/19
[58] Field of Search .................................. 359/485, 486; 362/19

[56] References Cited

U.S. PATENT DOCUMENTS

| | | |
|---|---|---|
| 2,224,214 | 12/1940 | Brown . |
| 2,287,598 | 6/1942 | Brown . |
| 2,748,659 | 6/1956 | Geffcken et al. . |
| 2,887,566 | 5/1959 | Marks . |
| 3,046,839 | 7/1962 | Bird et al. . |
| 3,436,143 | 4/1969 | Garrett . |
| 3,479,168 | 11/1969 | Bird et al. . |
| 3,536,373 | 10/1970 | Bird et al. . |
| 3,566,099 | 2/1971 | Makas . |

(List continued on next page.)

FOREIGN PATENT DOCUMENTS

| | | |
|---|---|---|
| 0317910A1 | 11/1987 | European Pat. Off. . |
| 0336334B1 | 4/1988 | European Pat. Off. . |
| 0349144B1 | 6/1988 | European Pat. Off. . |
| 0349309B1 | 6/1988 | European Pat. Off. . |
| 0357946B1 | 8/1988 | European Pat. Off. . |
| 0407830A2 | 7/1989 | European Pat. Off. . |
| 407830B1 | 7/1989 | European Pat. Off. . |
| 416157A1 | 9/1989 | European Pat. Off. . |
| 0488544A1 | 11/1990 | European Pat. Off. . |

(List continued on next page.)

OTHER PUBLICATIONS

Lloyd William Taylor Manual of Advanced Undergraduated Experiments in Physics, p. 302 (1959).

Flanders, Application of ≈100 Å linewidth structures fabricated by shadowing techniques[a], J. Vac. Sci. Technol., 19(4), Nov./Dec. 1981.

Kuta and van Driel, "Coupled–wave analysis of lamellar metal transmission gratings for the visible and the infrared," J. Opt. Soc. Am. A/vol. 12, No. 5/May 1995.

Lockbihler and Depine, "Diffraction from highly conducting wire gratings of arbitrary cross–section," Journal of Modern Optics, 1993, vol. 40, No. 7, pp. 1273–1298.

Novak et al., "Far infrared polarizing grids for use at cryogenic temperatures," Applied Optics, Aug. 15, 1989/vol. 28, No. 15, pp. 3425–3427.

Auton and Hutley, "Grid Polarizers for Use in the Near Infrared," Infrared Physics, 1972, vol. 12, pp. 95–100.

Stenkamp et al, "Grid polarizer for the visible spectral region," SPIE vol. 2213 pp. 288–296.

Handbook of Optics, 1978, pp. 10–68—10–77.

Handbook of Optics vol. II, $2^{nd}$ Edition, pp. 3.23–3.35.

(List continued on next page.)

*Primary Examiner*—Darren E. Schaberg
*Attorney, Agent, or Firm*—Thorpe, North & Western, LLP

[57] ABSTRACT

A broadband wire grid polarizer for the visible spectrum has a plurality of elongated elements supported on a substrate. A region having a lower refractive index than the refractive index of the substrate is disposed between the elements and the substrate to reduce the longest wavelength at which resonance occurs. The region may comprise a plurality of ribs extending from the substrate and supporting the elements. The ribs may be formed by etching slots into the substrate using the elements as a mask. The region may also comprise at least one layer of dielectric film. In addition the region may be comprise ribs extending from the surface, each having at least one layer of dielectric film disposed thereon.

96 Claims, 9 Drawing Sheets

U.S. PATENT DOCUMENTS

| | | |
|---|---|---|
| 3,631,288 | 12/1971 | Rogers . |
| 3,857,627 | 12/1974 | Harsch . |
| 3,876,285 | 4/1975 | Schwarzmüller . |
| 3,912,369 | 10/1975 | Kashnow . |
| 3,969,545 | 7/1976 | Slocum . |
| 4,009,933 | 3/1977 | Firester . |
| 4,025,164 | 5/1977 | Doriguzzi et al. . |
| 4,025,688 | 5/1977 | Nagy et al. . |
| 4,049,944 | 9/1977 | Garvin et al. . |
| 4,073,571 | 2/1978 | Grinberg et al. . |
| 4,181,756 | 1/1980 | Fergason . |
| 4,220,705 | 9/1980 | Sugibuchi et al. . |
| 4,221,464 | 9/1980 | Pedinoff et al. . |
| 4,268,127 | 5/1981 | Oshima et al. . |
| 4,289,381 | 9/1981 | Garvin et al. ................. 427/163.1 |
| 4,456,515 | 6/1984 | Krueger et al. . |
| 4,466,704 | 8/1984 | Schuler et al. . |
| 4,512,638 | 4/1985 | Sriram et al. . |
| 4,514,479 | 4/1985 | Ferrante . |
| 4,515,441 | 5/1985 | Wentz . |
| 4,688,897 | 8/1987 | Grinberg et al. . |
| 4,711,530 | 12/1987 | Nakanowatari et al. . |
| 4,743,092 | 5/1988 | Pistor . |
| 4,759,611 | 7/1988 | Downey, Jr. . |
| 4,759,612 | 7/1988 | Nakatsuka et al. . |
| 4,799,776 | 1/1989 | Yamazaki et al. . |
| 4,818,076 | 4/1989 | Heppke et al. . |
| 4,865,670 | 9/1989 | Marks . |
| 4,895,769 | 1/1990 | Land et al. . |
| 4,913,529 | 4/1990 | Goldenberg et al. . |
| 4,946,231 | 8/1990 | Pistor . |
| 4,966,438 | 10/1990 | Mouchart et al. . |
| 4,991,937 | 2/1991 | Urino . |
| 5,029,988 | 7/1991 | Urino . |
| 5,061,050 | 10/1991 | Ogura . |
| 5,087,985 | 2/1992 | Kitaura et al. . |
| 5,113,285 | 5/1992 | Franklin et al. . |
| 5,122,887 | 6/1992 | Mathewson . |
| 5,122,907 | 6/1992 | Slocum . |
| 5,139,340 | 8/1992 | Okumura . |
| 5,157,526 | 10/1992 | Kondo et al. . |
| 5,177,635 | 1/1993 | Keilmann . |
| 5,225,920 | 7/1993 | Kasazumi et al. . |
| 5,235,443 | 8/1993 | Barnik et al. . |
| 5,235,449 | 8/1993 | Imazeki et al. . |
| 5,239,322 | 8/1993 | Takanashi et al. . |
| 5,245,471 | 9/1993 | Iwatsuka et al. . |
| 5,295,009 | 3/1994 | Barnik et al. . |
| 5,305,143 | 4/1994 | Taga et al. . |
| 5,325,218 | 6/1994 | Willet et al. . |
| 5,333,072 | 7/1994 | Willett . |
| 5,357,370 | 10/1994 | Miyatake et al. . |
| 5,383,053 | 1/1995 | Hegg et al. . |
| 5,422,756 | 6/1995 | Weber . |
| 5,436,761 | 7/1995 | Kamon . |
| 5,486,935 | 1/1996 | Kalmanash . |
| 5,486,949 | 1/1996 | Schrenk et al. . |
| 5,490,003 | 2/1996 | Van Sprang . |
| 5,506,704 | 4/1996 | Broer et al. . |
| 5,508,830 | 4/1996 | Imoto et al. . |
| 5,513,023 | 4/1996 | Fritz et al. . |
| 5,513,035 | 4/1996 | Miyatake et al. . |
| 5,517,356 | 5/1996 | Araujo et al. . |
| 5,557,343 | 9/1996 | Yamagishi . |
| 5,559,634 | 9/1996 | Weber . |
| 5,570,215 | 10/1996 | Omae et al. . |
| 5,574,580 | 11/1996 | Ansley . |
| 5,579,138 | 11/1996 | Sannohe et al. . |
| 5,594,561 | 1/1997 | Blanchard . |
| 5,612,820 | 3/1997 | Schrenk et al. . |
| 5,619,356 | 4/1997 | Kozo et al. . |
| 5,626,408 | 5/1997 | Heynderickx et al. . |
| 5,748,368 | 5/1998 | Tamada et al. .................. 359/486 |
| 5,748,369 | 5/1998 | Yokota . |
| 5,833,360 | 11/1998 | Knox et al. . |

FOREIGN PATENT DOCUMENTS

| | | |
|---|---|---|
| 0507445A2 | 3/1991 | European Pat. Off. . |
| 0518111A1 | 5/1991 | European Pat. Off. . |
| 0588937B1 | 6/1991 | European Pat. Off. . |
| 0521591B1 | 7/1991 | European Pat. Off. . |
| 0543061A1 | 11/1991 | European Pat. Off. . |
| 0606940A2 | 1/1993 | European Pat. Off. . |
| 0634674A2 | 6/1993 | European Pat. Off. . |
| 0670506A1 | 9/1993 | European Pat. Off. . |
| 0744634A2 | 5/1995 | European Pat. Off. . |
| 416157 | 7/1925 | Germany . |
| 296391 | 2/1950 | Germany . |
| 3707984A1 | 3/1987 | Germany . |
| 0084502 | 8/1989 | Japan . |
| 1781659A1 | 10/1990 | U.S.S.R. . |

OTHER PUBLICATIONS

Glytsis and Gaylord, "High–spatial–frequency binary and multilevel stairstep gratings: polarization–selective mirrors and broadband antirelection surfaces," Applied Optics Aug. 1, 1992, vol. 31, No. 22 pp. 4459–4470.

Auton, "Infrared Transmission Polarizers by Photolithography," Applied Optics Jun. 1967, vol. 6, No. 6, pp. 1023–1027.

Haggans et al., "Lamellar gratings as polarization components for specularly reflected beams," Journal of Modern Optics, 1993, vol. 40, No. 4, pp. 675–686.

Bird and Parrish, Jr., "The Wire Grid as a Near–Infrared Polarizer," Lasers in Industry, pp. 886–891 (1972).

Optics $9^{th}$ Edition, pp. 338–339 (1980).

Whitbourn and Douglas, "Phase shifts in transmission line models of thin periodic metal grids," Applied Optics Aug. 15, 1989 vol. 28, No. 15, pp. 3511–3515.

Enger and Case, "Optical elements with ultrahigh spatial–frequency surface corrugations," Applied Optics Oct. 15, 1983, vol. 22, No. 20 pp. 3220–3228.

Knop, "Reflection Grating Polarizer for the Infrared," Optics Communications vol. 26, No. 3, Sep. 1978.

Haas and O'Hara, "Sheet Infrared Transmission Polarizers," Applied Optics Aug. 1965, vol. 4, No. 8 pp. 1027–1031.

Flanders, "Submicron periodicity gratins as artificial anisotropic dielectrics, " Appl. Phys. Lett. 42 (6), Mar. 15, 1983, pp. 492–494.

Li Li and J.A. Dobrowski, "Visible broadband, wide–angle, thin–film multilayer polarizing beam splitter," Applied Optics May 1, 1996, vol. 35, No. 13, pp. 2221–2224.

Sonek et al., "Ultraviolet grating polarizers," J. Vac. Sci. Technol., 19(4), Nov./Dec. 1981, pp. 921–923.

BROADBAND WIRE GRID POLARIZER FOR THE VISIBLE SPECTRUM

BACKGROUND OF THE INVENTION

1. Field of the Invention

The present invention relates to polarizing optical elements for use in the visible portion of the electromagnetic spectrum. More particularly, the present invention relates to broad bandwidth wire grid polarizers that efficiently transmit light of a specific polarization while efficiently reflecting light of the orthogonal polarization.

2. Prior Art

The use of an array of parallel conducting wires to polarize radio waves dates back more than 110 years. Wire grids, generally in the form of an array of thin parallel conductors supported by a transparent substrate, have also been used as polarizers for the infrared portion of the electromagnetic spectrum.

The key factor that determines the performance of a wire grid polarizer is the relationship between the center-to-center spacing, or period, of the parallel grid elements and the wavelength of the incident radiation. If the grid spacing or period is long compared to the wavelength, the grid functions as a diffraction grating, rather than as a polarizer, and diffracts both polarizations (not necessarily with equal efficiency) according to well-known principles. When the grid spacing or period is much shorter than the wavelength, the grid functions as a polarizer that reflects electromagnetic radiation polarized parallel to the grid elements, and transmits radiation of the orthogonal polarization.

The transition region, where the grid period is in the range of roughly one-half of the wavelength to twice the wavelength, is characterized by abrupt changes in the transmission and reflection characteristics of the grid. In particular, an abrupt increase in reflectivity, and corresponding decrease in transmission, for light polarized orthogonal to the grid elements will occur at one or more specific wavelengths at any given angle of incidence. These effects were first reported by Wood in 1902 (Philosophical Magazine, September 1902), and are often referred to as "Wood's Anomalies". Subsequently, Rayleigh analyzed Wood's data and had the insight that the anomalies occur at combinations of wavelength and angle where a higher diffraction order emerges (Philosophical Magazine, vol. 14(79), pp. 60–65, July 1907). Rayleigh developed the following equation to predict the location of the anomalies (which are also commonly referred to in the literature as "Rayleigh Resonances"):

$$\lambda = \epsilon(n \pm \sin\theta)/k \quad (1)$$

where $\epsilon$ is the grating period;

n is the refractive index of the medium surrounding the grating;

k is an integer corresponding to the order of the diffracted term that is emerging;

and $\lambda$ and $\theta$ are the wavelength and incidence angle (both measured in air) where the resonance occurs.

For gratings formed on one side of a dielectric substrate, n in the above equation may be equal to either 1, or to the refractive index of the substrate material. Note that the longest wavelength at which a resonance occurs is given by the following formula:

$$\lambda = \epsilon(n + \sin\theta) \quad (2)$$

where n is set to be the refractive index of the substrate.

The effect of the angular dependence is to shift the transmission region to larger wavelengths as the angle increases. This is important when the polarizer is intended for use as a polarizing beam splitter or polarizing turning mirror.

Figure 1:
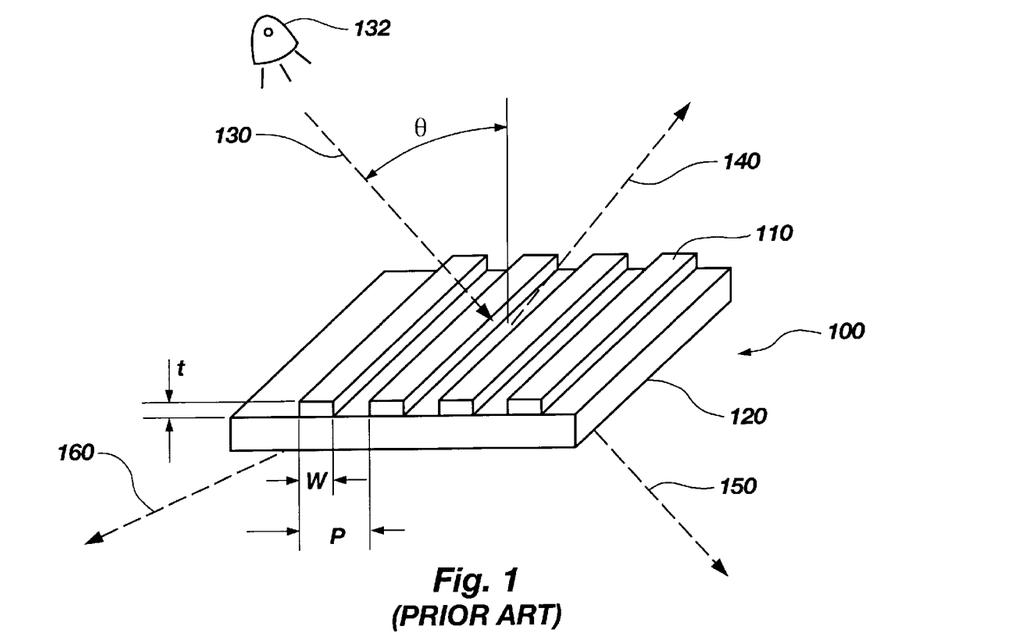
FIG. 1 is a perspective view of a prior art wire grid polarizer.

FIG. 1 illustrates a basic prior art wire grid polarizer and defines terms that will be used in a series of illustrative examples of the prior art and the present invention. The wire grid polarizer 100 is comprised of a multiplicity of parallel conductive electrodes 110 supported by a dielectric substrate 120. This device is characterized by the pitch or period of the conductors, designated p; the width of the individual conductors, designated w; and the thickness of the conductors, designated t. A beam of light 130 produced by a light source 132 is incident on the polarizer at an angle $\theta$ from normal, with the plane of incidence orthogonal to the conductive elements. The wire grid polarizer 100 divides this beam into a specularly reflected component 140, and a non-diffracted, transmitted component 150. For wavelengths shorter than the longest resonance wavelength given by equation 2, there will also be at least one higher-order diffracted component 160. Using the normal definitions for S and P polarization, the light with S polarization has the polarization vector orthogonal to the plane of incidence, and thus parallel to the conductive elements. Conversely, light with P polarization has the polarization vector parallel to the plane of incidence and thus orthogonal to the conductive elements.

In general, a wire grid polarizer will reflect light with its electric field vector parallel to the wires of the grid, and transmit light with its electric field vector perpendicular to the wires of the grid, but the plane of incidence may or may not be perpendicular to the wires of the grid as discussed here. The geometry chosen here is for clarity of illustration.

Ideally, the wire grid polarizer will function as a perfect mirror for one polarization of light, such as the S polarized light, and will be perfectly transparent for the other polarization, such as the P polarized light. In practice, however, even the most reflective metals used as mirrors absorb some fraction of the incident light and reflect only 90% to 95%, and plain glass does not transmit 100% of the incident light due to surface reflections.

Figure 2:
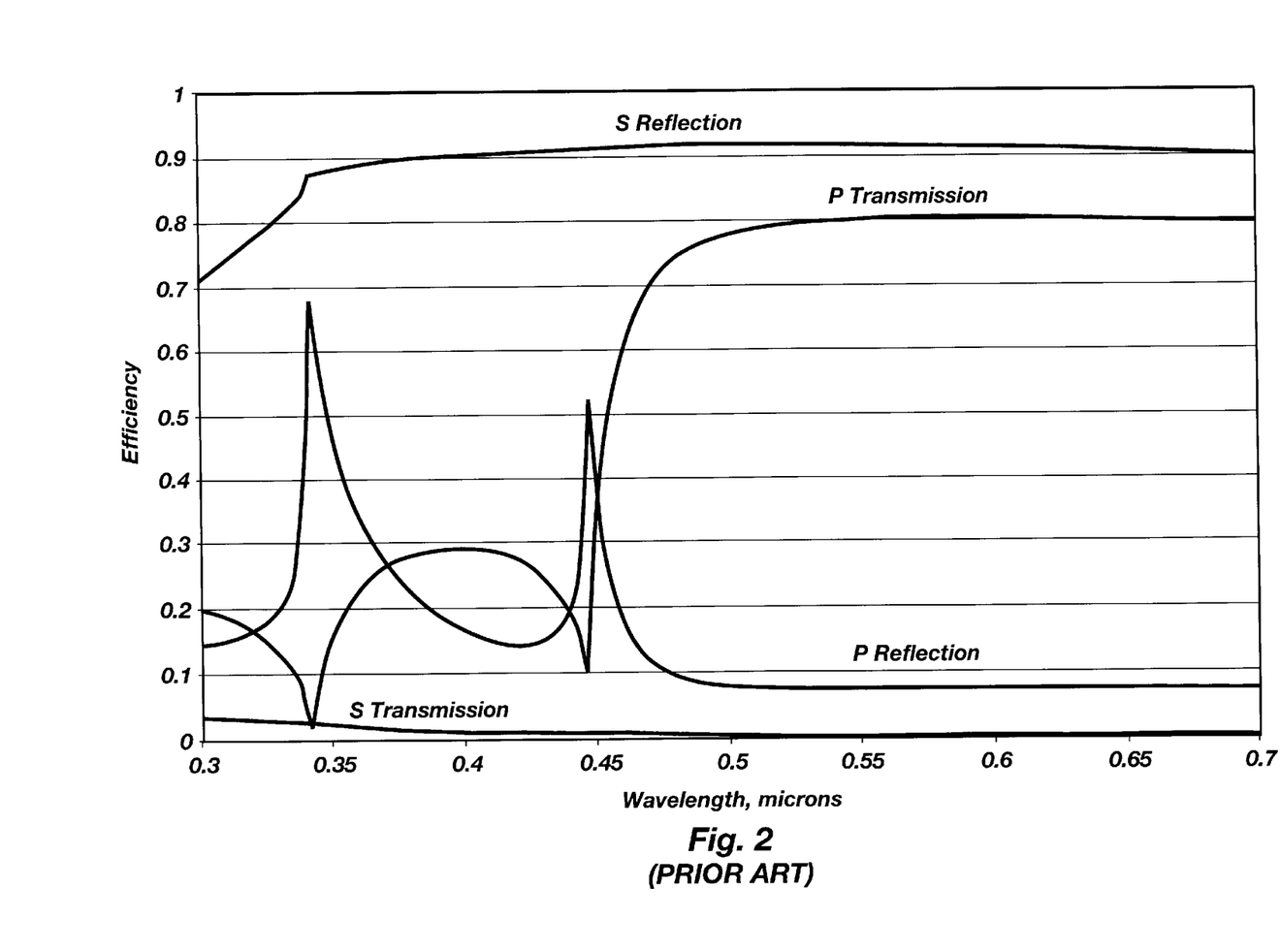
FIG. 2 is a graphical plot showing the relationship between wavelength and transmittance and reflectance of a prior art wire grid polarizer.

FIG. 2 shows the calculated non-diffracted, or zero-order, transmission and reflection of a prior art wire grid polarizer with the incidence angle $\theta$ equal to 45 degrees. These data were calculated using the Gsolver grating analysis software tool commercially available from Grating Solver Development Company, P.O. Box 353, Allen, Tex. This software tool implements the rigorous coupled wave analysis and modal methods. The analysis methods and results are similar to those reported in the literature ("Coupled-wave analysis of lamellar metal transmission gratings for the visible and the infrared", Journal of the Optical Society of America A, Vol. 12 No. 5, May 1995, pp. 1118–1127). The analysis assumes an aluminum grid with period p=0.2 $\mu$m, conductor width w=0.1 $\mu$m, conductor thickness t=0.1 $\mu$m, and substrate refractive index n=1.525. Note that two resonances occur at wavelengths of about 0.34 $\mu$m and about 0.445 $\mu$m, as predicted by equation 1. Also note that these resonances only affect significantly the polarizer characteristics for P polarization.

For incident light polarized in the S direction, the performance of the prior art polarizer approaches the ideal. The reflection efficiency for S polarization is greater than 90% over the visible spectrum from 0.4 $\mu$m to 0.7 $\mu$m. Over this wavelength band, less than 2.5% of the S polarized light is transmitted, with the balance being absorbed. Except for the small transmitted component, the characteristics of the wire grid polarizer for S polarization are very similar to those of a continuous aluminum mirror.

For P polarization, the transmission and reflection efficiencies of the wire grid are dominated by the resonance effect at wavelengths below about 0.5 μm. At wavelengths longer than 0.5 μm, the wire grid structure acts as a lossy dielectric layer for P polarized light. The losses in this layer and the reflections from the surfaces combine to limit the transmission for P polarized light to about 80% over the wavelength band from 0.5 μm to 0.7 μm.

Figure 3:
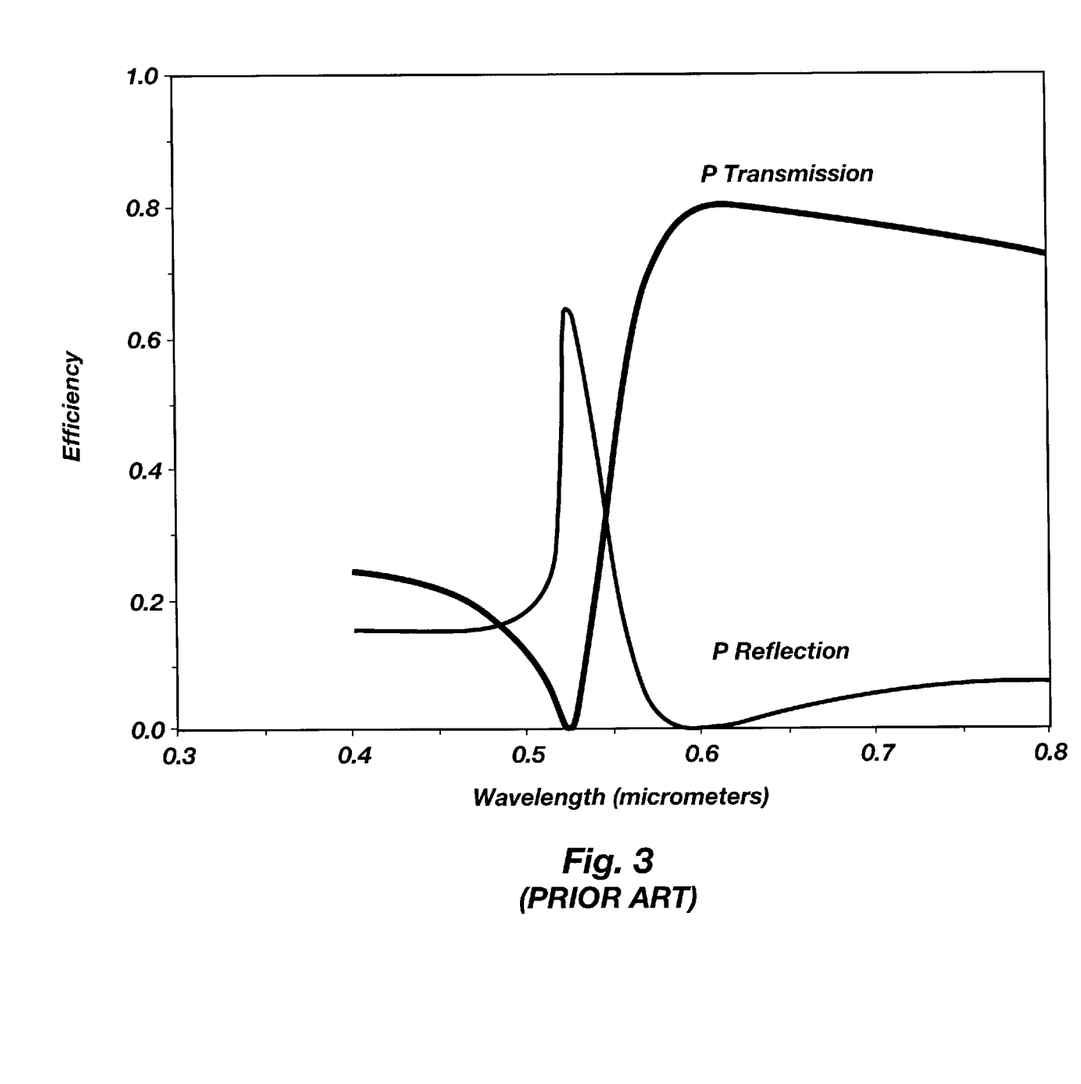
FIG. 3 is a graphical plot showing the relationship between wavelength and transmittance and reflectance of a prior art wire grid polarizer.

FIG. 3 shows the calculated performance of a different type of prior-art wire gird polarizer, as described by Tamada in U.S. Pat. No. 5,748,368. In this case, either an index matching fluid or adhesive has been used to laminate the grid structure between two substrates such that the grid is surrounded by a medium of constant refractive index. In this example, n=1.525 and the other grid parameters are unchanged from the previous example. This wire grid structure exhibits a single resonance at a wavelength about 0.52 μm, as predicted by equation 1. Note that there is a narrow wavelength region, from about 0.58 to 0.62 μm, where the reflectivity for P polarization is very nearly zero. U.S. Pat. No. 5,748,368 describes a wire grid polarizer that takes advantage of this effect to implement a narrow bandwidth wire gird polarizer with high extinction ratio. The examples given in the Tamada patent specification used a grid period of 550 nm, and produced a resonance wavelength from 800 to 950 nm depending on the grid thickness, conductor width and shape, and the angle of incidence. Note that the Tamada patent employs an unusual definition for polarization direction (P polarization is defined as parallel to the grid elements and thus orthogonal to the plane of incidence in defiance of the conventional definition). The resonance effect that Tamada exploits is different from the resonance whose position is predicted by Equation 1. While the two resonances may be coincident, they do not have to be. Tamada exploits this second resonance. Furthermore, there are thin film interference effects which may come into play. The bandwidth of the polarizer, where the reflectivity for the orthogonal-polarized light is less than a few percent, is typically 5% of the center wavelength. While this type of narrow band polarizer may have applications in optical memories and communications systems, many visible-light systems, such as liquid crystal displays, require polarizing optical elements with uniform characteristics over the visible-spectrum wavelengths from 400 nm to 700 nm.

Referring back to the data shown in FIG. 2, it can be seen that a necessary requirement for a wide band polarizer is that the longest wavelength resonance point must either be suppressed or shifted to a wavelength shorter than the intended spectrum of use. Referring back to equation 2, it can be seen that the wavelength of the longest-wavelength resonance point can be reduced in three ways. First, the grid period $\epsilon$ can be reduced. However, reducing the grid period increases the difficulty of fabricating the grid structure, particularly since the thickness of the grid elements must be maintained to ensure adequate reflectivity of the reflected polarization. Second, the incidence angle can be constrained to near-normal incidence. However, constraining the incidence angle would greatly reduce the utility of the polarizer device, and preclude its use in applications such as projection liquid crystal displays where a wide angular bandwidth centered on 45 degrees is desired. Third, the refractive index of the substrate could be lowered. However, the only cost-effective substrates available for volume manufacture of a polarizer device are several varieties of thin sheet glass, such as Corning type 1737F or Schott type AF45, all of which have a refractive index which varies between 1.5 and 1.53 over the visible spectrum.

Thus, there exists a need for an improved wire grid polarizer, particularly for use in visible light systems requiring broad wavelength bandwidth. In addition, there exists a need for such an improved wire grid polarizer for use at incidence angles of about 45 degrees. Specifically, there is a need for a polarizer structure in which the longest-wavelength resonance point can be eliminated or shifted to a shorter wavelength.

OBJECTS AND SUMMARY OF THE INVENTION

It is an object of the present invention to provide an improved wire grid polarizer which can provide high transmission and reflection efficiency over the entire visible spectrum.

It is another object of the present invention to provide such a wire grid polarizer which can provide such high efficiency when used over a wide range of incidence angles.

It is another object of the present invention to provide a process for fabrication of such polarizers.

These and other objects and advantages of the present invention are realized in a polarizer device comprising a grid of parallel conductive elements supported on a substrate, with a region of low refractive index and controlled thickness interposed between the grid elements and the substrate.

In accordance with one aspect of the present invention, the low index region is comprised of ribs extending from the substrate. The ribs may be formed by etching slots into the substrate using the grid elements as a self-aligning mask.

In accordance with another aspect of the present invention, the low index region is comprised of one or more dielectric films of low refractive index interposed between the grid elements and the substrate.

In accordance with another aspect of the present invention, the grid elements are supported by ribs formed by etching into or through one or more dielectric films interposed between the grid elements and the substrate.

In accordance with another aspect of the present invention, a process is provided for fabricating such polarizer devices.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

The present invention is a wide bandwidth wire grid polarizer comprised of an array of parallel, conductive elements separated from a supporting substrate by a region with a low refractive index and a controlled thickness. The low index region separating the wire grid from the substrate serves two purposes in the polarizer device. First, the presence of the low refractive index shifts the longest wavelength resonance point to a shorter wavelength. Second, the low index region can be implemented as one or more layers of controlled thickness designed to reduce the fraction of P polarized light that is reflected from the polarizer.

Figure 4:
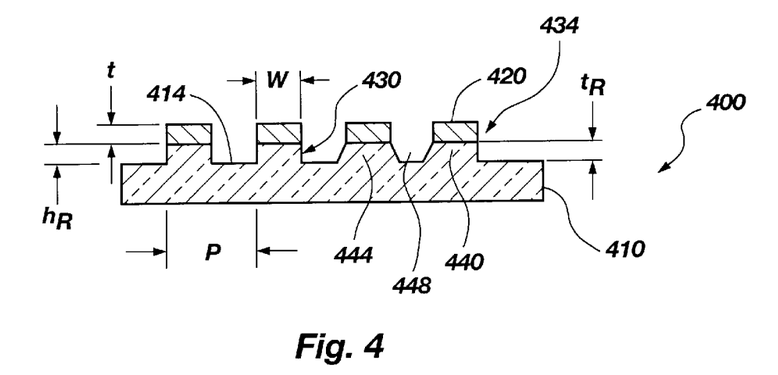
FIG. 4 is a cross-sectional view of a preferred embodiment of a wire grid polarizer of the present invention.
Figure 4A:
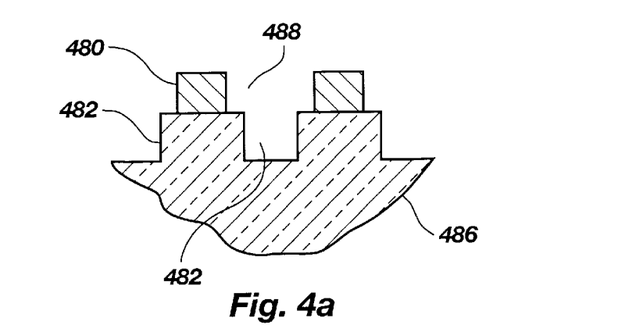
FIG. 4a is a partial cross-sectional view of an alternative embodiment of a wire grid polarizer of the present invention.

As illustrated in FIG. 4, a preferred embodiment of a wire grid polarizer of the present invention is shown, indicated generally at 400. The polarizer 400 is comprised of a plurality of parallel, elongated conductive elements 420 supported by a transparent substrate 410. The substrate 410 has a first surface 414 and a refractive index $n_S$, or index of refraction. As discussed below, the substrate may be glass, and may have a refractive index $n_S$ of approximately 1.5.

The dimensions of the elements, and the dimensions of the arrangement of elements, are determined by the wavelength used, and are tailored for broad or full spectrum visible light. The elements 420 are relatively long and thin. Preferably, each element 420 has a length that is generally larger than the wavelength of visible light. Thus, the elements 420 have a length of at least approximately 0.7 μm (micrometers or microns). The typical length, however, may be much larger.

In addition, the elements 420 are located in generally parallel arrangement with the spacing, pitch, or period P of the elements smaller than the wavelength of light. Thus, the pitch will be less than 0.4 μm (micrometers or microns). As indicated above, one way of reducing the longest wavelength at which resonance occurs for a given angle of incidence, is to reduce the period. But reducing the period creates manufacturing difficulties. Thus, the pitch P preferably will be approximately one-half the wavelength of light, or approximately 0.2 μm. Again, it will be noted that grids with longer periods (greater than approximately twice the wavelength of light or 1.4 μm) operate as diffraction gratings; grids with shorter periods (less than approximately half the wavelength of light or 0.2 μm) operate as a polarizer; and grids with periods in the transition region (between approximately 0.2 and 1.4 μm) also act as diffraction gratings and are characterized by abrupt changes or anomalies referred to as resonances. As indicated above, prior art devices characterized by resonances within the visible spectrum have narrow operating ranges due to the anomalies which occur at various wavelengths within the visible spectrum. This transition region is an important concept in understanding the behavior of the wire grid. The wide bandwidth polarizers of the present invention must necessarily be designed to stay outside this transition region in order to obtain wide bandwidth performance over the spectrum of intended use. Therefore, the bounds of this transition region are useful in defining the upper limits on the period of the wire grid of the present invention.

As noted, the angular dependence given in Equation 1 shifts the transition region to longer wavelengths as the angle of incidence increases. This shift can be increased additionally by decreasing the pitch. At normal incidence with a substrate with a refractive index of 1, the transition region is given approximately by $0.5\lambda \leq p \leq 2\lambda$. For a substrate with refractive index $n_S$ and light incident at an angle θ relative to the normal, the lower limit of the period needs to be reduced by the factor derived in Equation 1:

$$\frac{0.5\lambda}{(n_s + \sin\theta)} \leq p \qquad \text{Equation 3}$$

For a very high index glass with a refractive index of 1.7 and angle of 75°, Equation 3 becomes $0.19\lambda \leq p$. So the effective transition region, for any angle of incidence and any conventional substrate material for the visible spectrum is approximately bounded by $0.19\lambda \leq p \leq 2\lambda$.

In addition, each element 420 has a width W that may range from 10% to 90% of the pitch P. The elements 420 also have a thickness t which may be greater than approximately 200 Å or 20 nm, and will be less than approximately 300 nm due to practical limitations in fabrication. Furthermore, the elements 420 are preferably regularly or equally spaced.

The element width W can be selected to optimize the performance of the polarizer device for specific applications. Increasing the width of the elements with respect to the pitch will increase the reflectivity for the parallel polarization to nearly 100% while also increasing the reflectivity for the orthogonal polarization above the ideal value of 0%. Thus, a high ratio of element width to spacing will provide high extinction ratio for transmitted light (since none of the parallel polarization is transmitted, but not necessarily high efficiency (since some of the orthogonal polarization will be reflected). Conversely, a low ratio of element width to pitch will provide high extinction ratio for the reflected beam, but not necessarily high efficiency. The highest total efficiency, as defined by the product of the reflectivity for the parallel beam and the transmissivity for the orthogonal beam, is likely to be obtained when the ratio of the element width to pitch is 40% to 60%.

The arrangement of elements 420 is not drawn to scale and has been greatly exaggerated for clarity. In fact, the arrangement of elements is imperceptible to the naked eye and appears as a partially mirrored surface when observed without extreme magnification. The elements 420 are formed of any material that is capable of being formed into a broad spectrum mirror, such as a metal. Preferably, the material is silver or aluminum for visible light applications.

In the preferred embodiment, the conductive elements 420 advantageously are supported on ribs 430 extending from the substrate 410 or the first surface 414. The ribs 430 may be the same material as the substrate 410, and may be formed integrally with the substrate. For example, the ribs 430 may be formed by etching away a portion of the substrate 410 exposed between the elements 420, using the elements 420 as a mask as discussed more fully below.

The ribs 430 have a height or thickness $h_R$ and define a region, indicated generally at 434, disposed between the elements 420 and the substrate 410, or the surface 414, which separates the elements 420 from the substrate 410. The region 434 created by the ribs 430 advantageously has an average index of refraction $n_R$ which is significantly less than the index of refraction $n_S$ of the substrate, or the ribs 434 and substrate 410 satisfy the condition $n_R<n_S$. For example, the ribs 430 may be glass and have a reflective index $n_S$ of 1.525. Using Bruggeman's method (Ann. Phys (Leip.), Vol. 24, pp. 636 (1935)) for an effective medium refractive index for equally wide ribs and grooves, $n_R$ has a value of about 1.41.

The region 434 has a thickness, indicated by $t_R$, which is defined by the height $h_R$ of the ribs 430 in the preferred embodiment. The elements 420 are separated from the substrate 410 or surface 414 by a distance equal to the thickness $t_R$ of the region. The height $h_R$ of the ribs 430, or thickness $t_R$ of the region 434, may be altered to adjust the performance of the polarizer 400. Separating the elements 420 from the substrate 410 or surface 414, and interposing a region 434 having a lower refractive index than that of the substrate 410, advantageously increases the p-polarization transmission efficiency of the polarizer 410 at shorter wavelengths, lowers the minimum wavelength at which the polarizer 410 is useful, or shifts the highest resonance point to a shorter wavelength, as discussed more fully below.

Figure 4B:
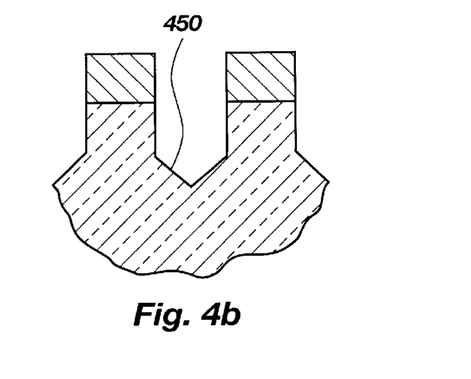
FIG. 4b is a partial cross-sectional view of an alternative embodiment of a wire grid polarizer of the present invention.
Figure 4C:
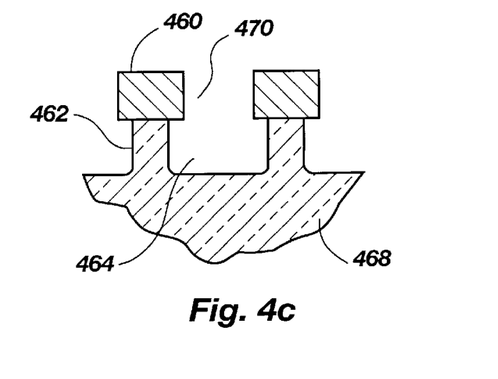
FIG. 4c is a partial cross-sectional view of an alternative embodiment of a wire grid polarizer of the present invention.

In addition, the ribs 430 have a cross-sectional shape which may be rectangular or square, as indicated at 440, or which may be generally trapezoidal, as indicated at 444. The trapezoid ribs 444 may form partial V-shaped grooves 448 between the ribs 444. The shape of the ribs 430 also effects the efficiency of the polarizer 410, as discussed more fully below. As shown in FIG. 4b, the bottom of the grooves 450 between the ribs 452 may be V-shaped. In addition, as shown in FIG. 4c, the elements 460 may be wider than the ribs 462, or the grooves 464 in the substrate 468 may be wider than the grooves 470 between the elements 460. Alternatively, as shown in FIG. 4d, the elements 480 may be more narrow than the ribs 482, or the grooves 484 in the substrate 486 may be more narrow than the space 488 between the elements 480.

Figure 5:
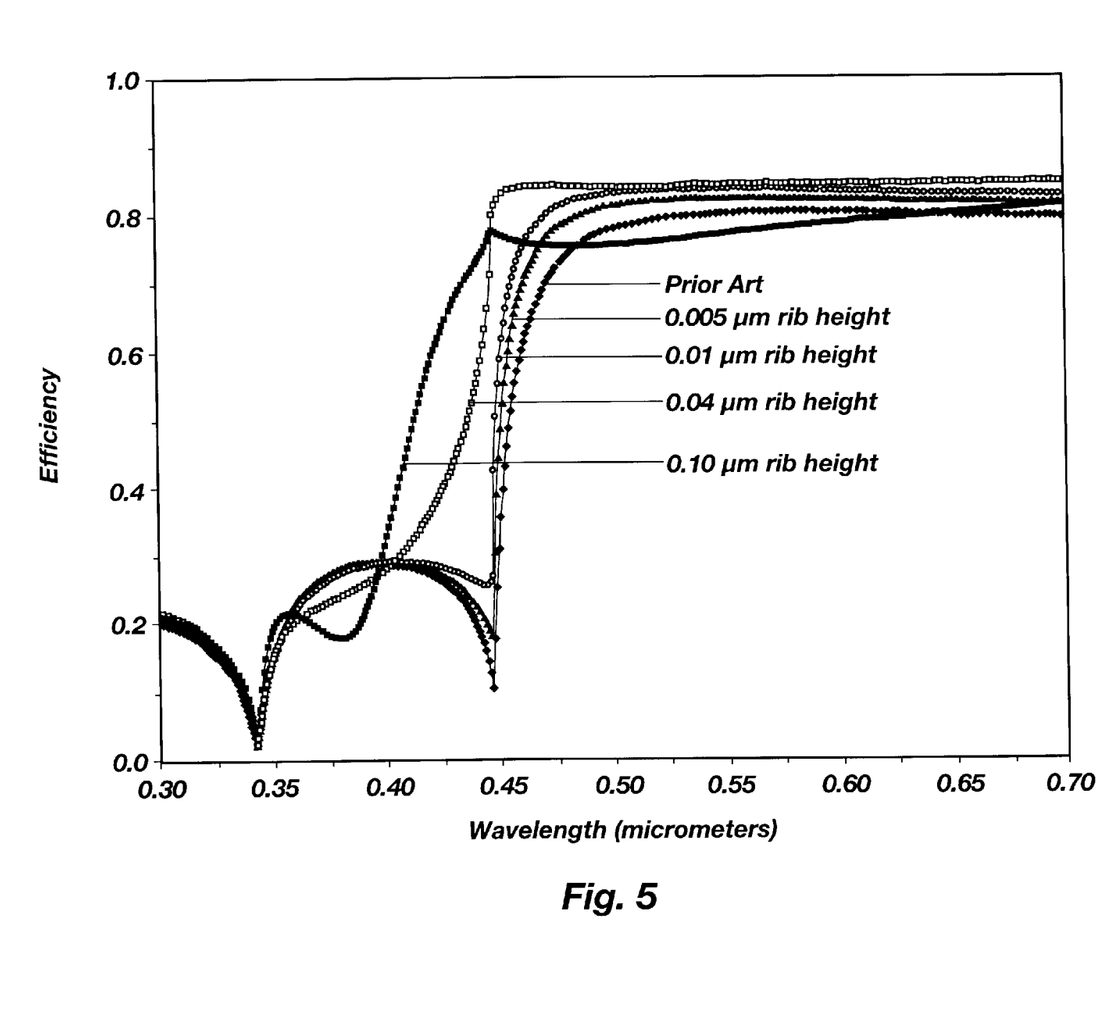
FIG. 5 is a graphical plot showing the relationship between wavelength and transmittance and reflectance for P polarization of the preferred embodiment of the wire grid polarizer of the present invention.

FIG. 5 shows the calculated relationship between the wavelength of the incident beam and the p-polarization transmission efficiency of the polarizer device 410 of FIG. 4 for four different rib heights $h_R$ or region thicknesses $t_R$, namely 0.005, 0.01, 0.04 and 0.1 µm, with respect to the prior art. The analysis assumptions are similar to those of the previous example: grating pitch or period p=0.2 µm, conductor width w=0.1 µm, conductor thickness t=0.1 µm, incidence angle=45° and substrate index=1.525. The selected substrate index is representative of available moderate cost sheet glass materials including Corning type 1737 and Schott type AF45. The analysis assumes ribs of rectangular cross section formed by anisotropic etching into the substrate between the conductive elements.

As shown in FIG. 5, a rib height $h_R$, or region thickness $t_R$, between 0.005 and 0.10 µm clearly lowers the minimum wavelength at which this device is useful. Note that the presence of ribs with 0.04 micron height also improves the transmission efficiency of the polarizer device over the entire visible spectrum.

It is important to notice in FIG. 5, that every etch depth depicted from 0.005 µm up to 0.1 µm improves the performance of the present invention over the prior art. It is remarkable how a groove depth as small as 0.005 µm significantly affects the performance at the shorter wavelengths in the blue for the particular wire grid polarizer structure modeled. This result has been observed in numerous similar calculations as well as in initial experiments, with the effect becoming even more pronounced at the smaller periods. It is believed that even ribs with a height as small as 1 nm to 2 nm will prove valuable for some particular wire grid polarizer structures.

Figure 6:
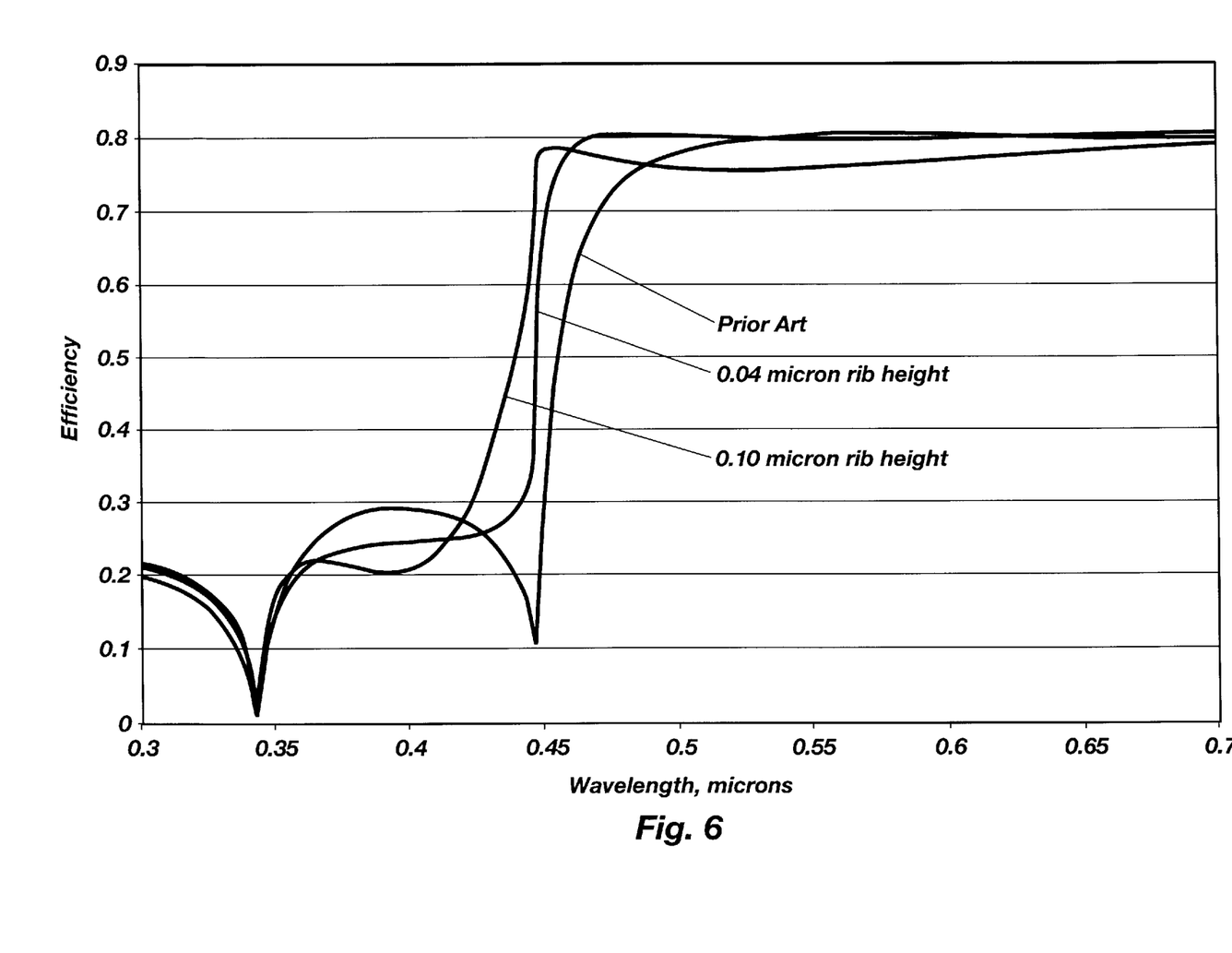
FIG. 6 is a graphical plot showing the relationship between wavelength and transmittance and reflectance for P polarization of an alternative embodiment of a wire grid polarizer of the present invention.

The exact shape of the ribs has a secondary effect on the polarizer performance. FIG. 6 shows the calculated relationship between wavelength and p-polarization transmission efficiency for a polarizer where the conductive elements are supported on trapezoidal ribs separated by V-shaped grooves etched into the substrate. The effect of the trapezoidal ribs is similar, but not as beneficial, as that of the rectangular ribs previously described.

Figure 7:
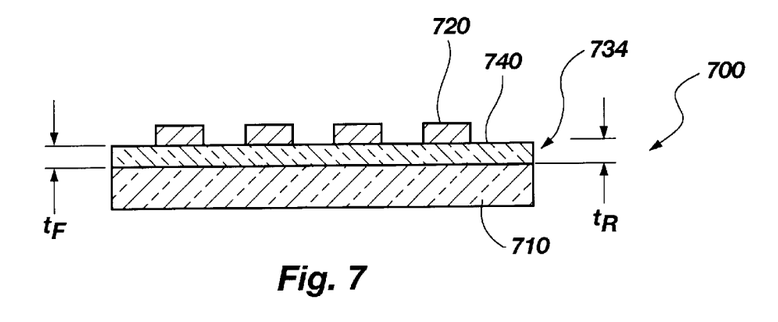
FIG. 7 is a cross-sectional, schematic view of an alternative embodiment of a wire grid polarizer of the present invention.

FIG. 7 is a cross sectional diagram of an alternative embodiment of the present invention. The polarizer 700 is comprised of a plurality of parallel, elongated conductive elements 720 supported by a transparent substrate 710. One or more layers or films of dielectric material 740 are interposed between the conductive elements 720 and the substrate 710. The layer or film 740 has a thickness $t_F$ and a refractive index $n_F$, and defines a region 734 with a region thickness $t_R$. To have the desired effect of shifting the resonance point to a shorter wavelength, at least one of these dielectric layers 740 must have a refractive index $n_F$ substantially less than the refractive index $n_S$ of the substrate 710, or satisfy the condition $n_F<n_S$.

Figure 8:
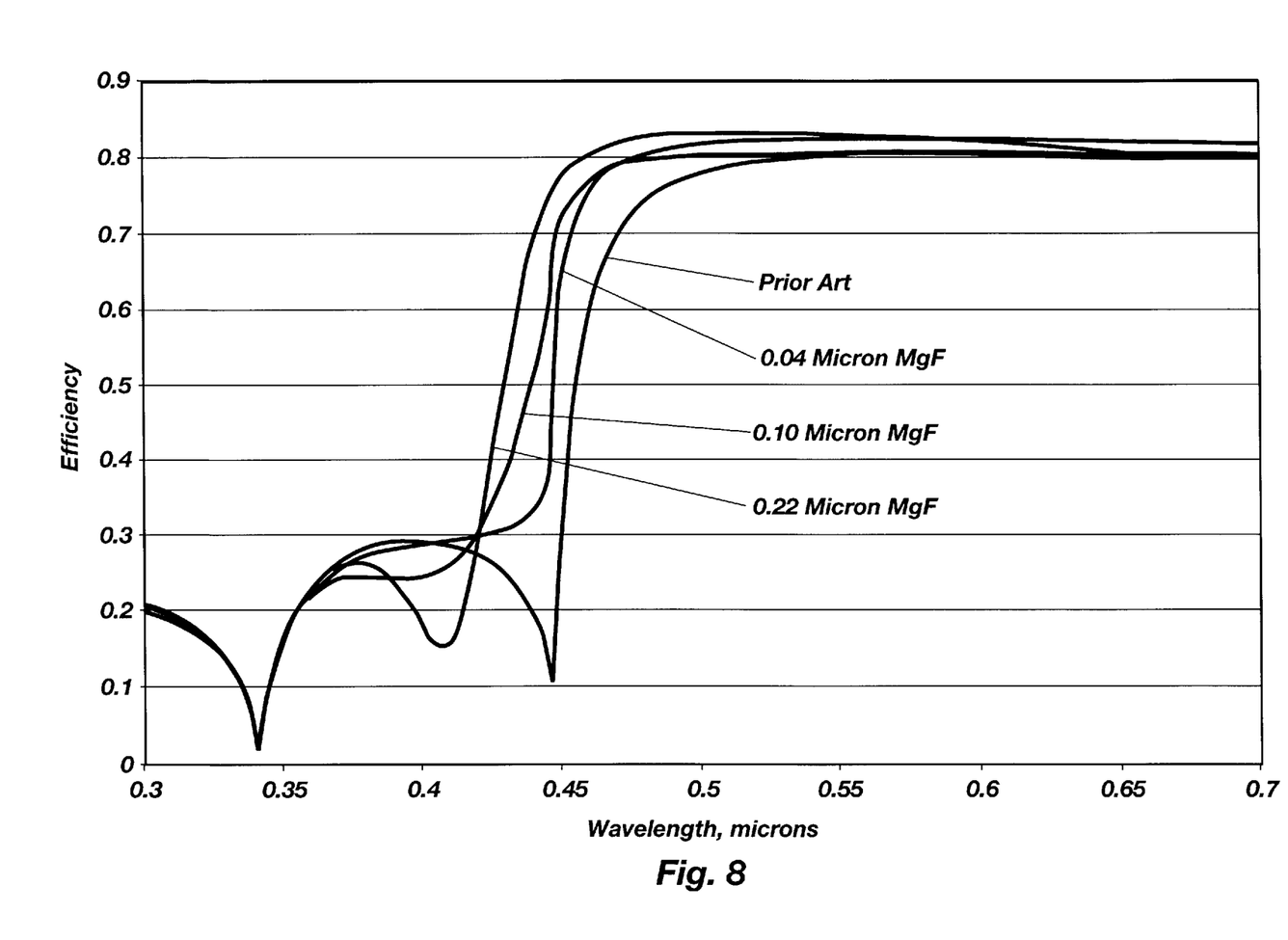
FIG. 8 is a graphical plot showing the relationship between wavelength and transmittance and reflectance for P polarization of the alternative embodiment of the wire grid polarizer of the present invention.

FIG. 8 shows the calculated relationship between wavelength and P-polarization transmission efficiency for a wire grid polarizer when a single layer of Magnesium Fluoride (MgF$_2$), having n=1.38, is interposed between the conductive elements and the substrate with three different thickness $t_F$, namely 0,04, 0.1 and 0.22 µm, with respect to the prior art. The other assumptions of the analysis are the same as in the previous examples. Increasing the thickness of the MgF$_2$ from 0 to 0.22 µm progressively shifts the longest wavelength resonance point from about 0.445 µm to 0.41 µm, thus increasing the useful bandwidth of the polarizer device. The presence of a 0.22 micron film also improves the polarizer transmission over the entire visible spectrum.

Auton (Applied Optics, Volume 6 No. 6, June 1967, pp 1023–7) previously described the use of a single layer antireflection coating, which he termed a "blooming layer", between a wire grid and the supporting substrate. His analysis, based on simple impedance-matching formulas and perfectly conducting thin metal strips, indicated that this layer should have a refractive index equal to the square root of the refractive index of the substrate, and an optical thickness of one-fourth of the wavelength of interest. Auton concluded that the performance of a wire grid fabricated in this manner is equivalent to the performance of an unsupported grid specifically for "laser applications where operation at only a single wavelength is required." Auton was either unaware of the resonance effect or chose to ignore the resonance effects by means of an assumption that the grid spacing was much smaller than the wavelength of interest. Furthermore, the condition for a blooming layer is different for the condition needed to move or suppress a resonance as predicted by Equation 1. An impedance-matching blooming layer, as suggested by Auton, will be effective over a narrow range of parameters, while the embodiments of the present invention will be effective over a wide range of parameters. Thus Auton did not teach the second embodiment of the present invention.

Figure 9:
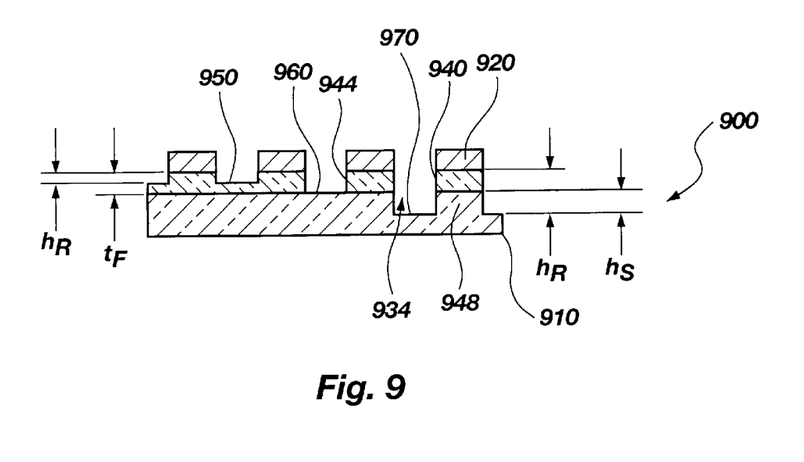
FIG. 9 is a cross-sectional, schematic view of another alternative embodiment of a wire grid polarizer of the present invention.

FIG. 9 is a cross section drawing of yet another embodiment of the present invention in which the polarizer device 900 is comprised of conductive elements 920 supported by ribs 940. The ribs 940 may be formed by etching into one or more dielectric layers 944, and even the substrate 910, exposed between the conductive elements 920. Thus, the ribs 940 may be formed by one or more film layers 944, or a portion of the film layer 944, as indicated at 950 and 960. In addition, the ribs 940 may be formed by multiple film layers 944. The film layers 944 may be multiple layers of the same material to achieve a desired thickness or height of a single material. The film layers 944 also may be various different materials to achieve different effects or performance characteristics.

Furthermore, the ribs 940 may be formed of layers of different materials, as indicated at 970. One of the layers may be the same material as the substrate 910, and may be formed integrally with the substrate 910. For example, as indicated at 970, one of the layers may be similar to the ribs 430 described above and shown in FIG. 4, and define partial substrate ribs 948 forming a portion of the entire ribs 940. Thus, the ribs 940 may be formed both by film layers 944, and substrate ribs 948 formed in the substrate 910, with the film layers 944 deposited on the substrate ribs 948, as indicated at 970. As indicated above, the ribs 940 may be formed by etching into the layers 944 and the substrate 910 between the elements 920.

Again, a region 934 is defined by the ribs 940, which may be formed in the film layer 944, by the film layer 944, or by the film layer 944 and the substrate ribs 948. This configuration has the potential to advantageously combine the effects of a low index layer and the effects of a ribbed substrate. The overall height $h_R$ of the ribs 940 may be only a fraction of the dielectric layer 944 thickness $t_F$, as shown at 950; may be equal to the dielectric layer 944 thickness $t_F$, as shown at 960; or may exceed the dielectric layer 944 thickness $t_F$, as shown at 970. Thus, as shown at 970, the region thickness $t_R$ and overall rib 940 height $h_R$ are formed by the layer 944 thickness $t_F$ and the substrate rib 948 height $h_S$. The substrate ribs 948 become substructures for the combined ribs 940 formed by the substrate ribs 948 and film layer 944, such that the substrate ribs 948 each have a plurality of film layers 944 disposed thereon.

Figure 10:
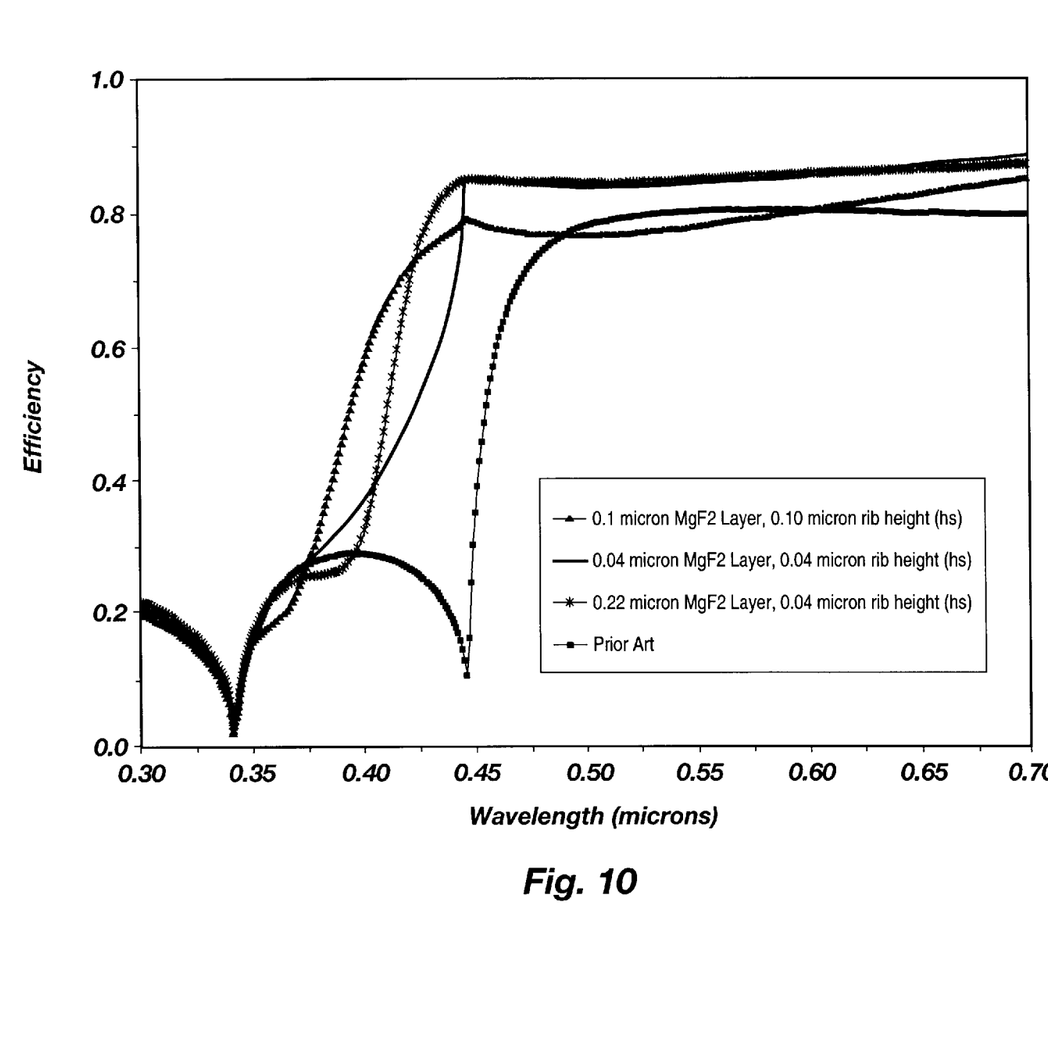
FIG. 10 is a graphical plot showing the relationship between wavelength and transmittance and reflectance for P polarization of the other alternative embodiment of the wire grid polarizer of the present invention.

FIG. 10 shows the relationship between wavelength and p-polarization transmittance for polarizer devices fabricated with a single layer of $MgF_2$ between the substrate and the conductive elements, and three different combinations of substrate rib height $h_S$ and $MgF_2$ film thickness $t_F$. In two cases, the substrate rib height $h_S$ and the $MgF_2$ film thickness $t_F$ are the same. In the first case, the substrate rib height $h_S$ and the film thickness $t_F$ are both 0.04 μm, for a rib height $h_R$ and region thickness $t_R$ of 0.08 μm. In the second case, the substrate rib height $h_S$ and the film thickness $t_F$ are both 0.10 μm, for a rib height $h_R$ and region thickness $t_R$ of 0.20 μm. In the third case, the $MgF_2$ film thickness $t_F$ is 0.22 μm and the substrate ribs height $h_S$ is only 0.04 μm, for a region thickness $t_R$ of 0.26 μm. Compared to the prior art polarizer, this later combination shifts the 50% transmission point from about 0.46 μm to about 0.41 μm and increases the average polarizer transmission over the visible spectrum by about 6%.

Figure 11:
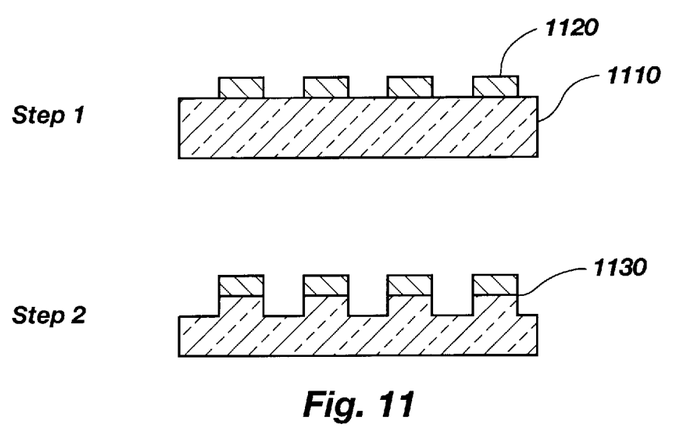
FIG. 11 is a cross-sectional, schematic view of process steps of a preferred method of making a wire grid polarizer of the present invention.

FIG. 11 illustrates the process for fabricating the polarizer device previously shown in FIG. 4. The first step is to form the array of parallel conductive elements 1120 on the substrate 1110. The formation of these elements 1120 can be done by any of several commonly-known processes. For example, both Garvin, in U.S. Pat. No. 4,049,944, and Ferrante, in U.S. Pat. No. 4,514,479, describe the use of holographic interference lithography to form a fine grating structure in photoresist, followed by ion beam etching to transfer the structure into an underlying metal film. Stenkamp ("Grid polarizer for the visible spectral region", Proceedings of the SPIE, vol. 2213, pages 288–296) describes the use of direct e-beam lithography to create the resist pattern, followed by reactive ion etching to transfer the pattern into a metal film. Other high-resolution lithography techniques, including extreme ultraviolet lithography and X-ray lithography could also be used to create the resist pattern. Other techniques, including other etching mechanisms and lift-off processes, could be used to transfer the pattern from the resist to a metal film. The exact process used to form the array of parallel conductive elements is not critical to the present invention.

The second step, after formation of the parallel conductive elements 1120, is to etch the substrate 1110 using the conductive elements 1120 as a mask, and thus create the ribs 1130 that support the conductors 1120. Ion beam etching or reactive ion etching of the appropriate chemistry, depending on the substrate 1110 material could be used to etch grooves into the substrate 1110.

Figure 12:
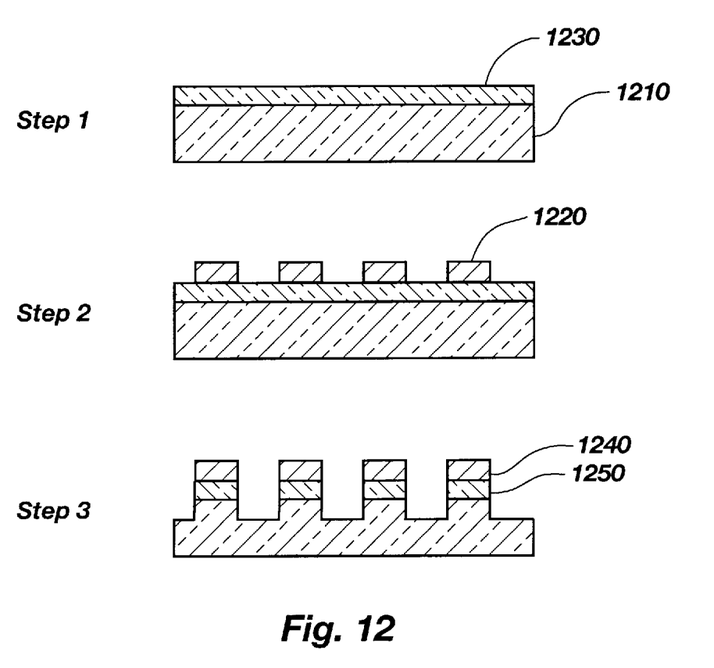
FIG. 12 is a cross-sectional, schematic view of process steps of an alternative method of making a wire grid polarizer of the present invention.

FIG. 12 illustrates the process for fabricating the polarizer devices previously illustrated in FIGS. 7 and 9. The first process step is to deposit one or more layers of transparent dielectric materials 1230 on one surface of a transparent substrate 1210. The second step is to form the array of parallel conductive elements 1220 as previously described. The third step is to form the ribs 1240 that will support the conductive elements by etching the underlying layers 1230 using the conductive elements 1220 as a mask. The depth of the etch may be limited to a fraction of the dielectric film layer 1230 thickness, may extended through the dielectric film layers 1230, or may extend through the dielectric film layers 1230 into the substrate 1210 as desired.

It is to be understood that the described embodiments of the invention are illustrative only, and that modifications thereof may occur to those skilled in the art. For example, while the invention has been described in terms of examples wherein the incidence angle is 45 degrees, the invention is equally applicable to other incidence angles with appropriate adjustment of the physical parameters of the polarizer device. In addition, while a primary benefit of the invention is to extend the useful bandwidth of the polarizer device to shorter wavelengths in the visible spectrum, the invention may also be used to improve the transmission of polarizer devices for use in other regions of the spectrum such as the infrared. Other alterations will surely occur to those skilled in the art given the significant increase in design flexibility over the prior art that is achieved by the present invention. Accordingly, this invention is not to be regarded as limited to the embodiments disclosed, but is to be limited only as defined by the appended claims herein.

What is claimed is:

1. A broadband wire grid polarizer for the visible spectrum, the polarizer comprising:

a substrate having a first surface and a refractive index;

a region on the first surface of the substrate having a refractive index which is less than the refractive index of the substrate; and an array of parallel, elongated elements disposed on the region; and wherein the array has a configuration and the elements have a size which would normally create a resonance effect in combination with the substrate within the visible spectrum; and wherein the region with a lower refractive index than the substrate refractive index causes a shift of the normally occurring resonance effect to a lower wavelength, thereby broadening a band of visible wavelengths in which no resonance effect occurs.

2. The polarizer of claim 1, wherein the elements have a period of between approximately half the wavelength of visible light and twice the wavelength of visible light.

3. The polarizer of claim 1, wherein the elements have a period of between approximately 0.076 to 1.4 µm.

4. The polarizer of claim 1, wherein the region has a thickness of between approximately 0.001 and 0.3 µm.

5. The polarizer of claim 1, wherein the elements have a thickness of between approximately 0.04 and 0.3 µm; and wherein the elements are aluminum or silver.

6. The polarizer of claim 1, wherein the region comprises a plurality of ribs extending from the substrate.

7. The polarizer of claim 6, wherein the ribs are integral with the substrate, and are formed of the same material as the substrate.

8. The polarizer of claim 6, wherein each rib is comprised of at least one layer of material which is different from the material of the substrate.

9. The polarizer of claim 8, wherein the at least one layer of material is magnesium fluoride.

10. The polarizer of claim 9, wherein the at least one layer has a thickness between approximately 0.04 and 0.22 µm.

11. The polarizer of claim 6, wherein the ribs have a rectangular-shaped cross section.

12. The polarizer of claim 6, wherein the ribs have a trapezoidal-shaped cross section.

13. The polarizer of claim 1, wherein the region includes a layer of dielectric material.

14. The polarizer of claim 13, wherein the layer of dielectric material includes magnesium fluoride.

15. The polarizer of claim 13, wherein the layer has a thickness between approximately 0.001 and 0.3 µm.

16. The polarizer of claim 1, wherein the region comprises at least one layer of material different from the material of the substrate, and a plurality of ribs formed in and extending from the at least one layer.

17. The polarizer of claim 1, wherein the region comprises a plurality of ribs formed in and extending from the substrate, each of the plurality of ribs having at least one layer of material disposed thereon which is different from the material of the rib.

18. The polarizer of claim 1, wherein the substrate is glass, and the region comprises magnesium fluoride.

19. The polarizer of claim 1, wherein the substrate has a refractive index of approximately 1.5, and the region has a refractive index of approximately 1.4.

20. A broadband wire grid polarizer for the visible spectrum, the polarizer comprising:

a transparent substrate having a first surface and a refractive index;

an array of parallel, elongated elements supported by the substrate; and a region disposed between the elements and the substrate having a refractive index which is less than the refractive index of the substrate, and having a thickness of between approximately 0.001 and 0.3 µm.

21. The polarizer of claim 20, wherein the array of elements is configured to interact with the electromagnetic waves of the light in the visible spectrum to generally reflect most of the light of a first polarization and transmit most of the light of a second polarization; and wherein the array has a configuration and the elements have a size which would normally create a resonance effect within the visible spectrum in which a significant amount of the second polarization is reflected rather than transmitted; and wherein the region with a shorter refractive index than the substrate refractive index causes a shift of the normally occurring resonance effect to a lower wavelength, thereby broadening a band of visible wavelengths in which no resonance effect occurs.

22. The polarizer of claim 20, wherein the elements have a period between approximately 0.076 to 0.2 µm.

23. The polarizer of claim 20, wherein the elements have a thickness of between approximately 0.04 and 0.3 µm; and wherein the elements are aluminum or silver.

24. The polarizer of claim 20, wherein the region comprises a plurality of ribs extending from the substrate.

25. The polarizer of claim 24, wherein the ribs are integral with the substrate, and are formed of the same material as the substrate.

26. The polarizer of claim 24, wherein each rib is comprised of at least one layer of material which is different from the material of the substrate.

27. The polarizer of claim 26, wherein the at least one layer of material is magnesium fluoride.

28. The polarizer of claim 24, wherein the ribs have a rectangular-shaped cross section.

29. The polarizer of claim 24, wherein the ribs have a trapezoidal-shaped cross section.

30. The polarizer of claim 20, wherein the region includes a film of dielectric material.

31. The polarizer of claim 30, wherein the film of dielectric material includes magnesium fluoride.

32. The polarizer of claim 20, wherein the region comprises at least one layer of material different from the material of the substrate, and a plurality of ribs formed in and extending from the at least one layer.

33. The polarizer of claim 20, wherein the region comprises a plurality of ribs formed in and extending from the substrate, each of the plurality of ribs having at least one layer of material disposed thereon which is different from the material of the rib.

34. The polarizer of claim 20, wherein the substrate is glass, and the region comprises magnesium fluoride.

35. The polarizer of claim 20, wherein the substrate has a refractive index of approximately 1.5, and the region has a refractive index of approximately 1.4.

36. An apparatus for polarizing broad bandwidth, visible light, the apparatus comprising:

a light source producing a light beam having at least one wavelength within the visible spectrum;

a transparent substrate disposed in the light beam having a first surface and a refractive index;

an array of parallel, elongated elements coupled to the first surface of the substrate; and a region disposed between the first surface of the substrate and the elements, the region having a refractive index which is less than the refractive index of the substrate; and wherein the array of elements is configured to interact with the electromagnetic waves of the light in the visible spectrum to generally reflect most the light of a first polarization and transmit most the light of a second polarization; and wherein the array has a configuration and the elements have a size which would normally create a resonance effect in combination with the substrate within the visible spectrum in which a significant amount of the second polarization is reflected rather than transmitted; and wherein the region with a lower refractive index than the substrate refractive index causes a shift of the normally occurring resonance effect to a lower wavelength, thereby broadening a band of visible wavelengths in which no resonance effect occurs.

37. The apparatus of claim 36, wherein the elements have a period of approximately half the wavelength of the beam of visible light.

38. The apparatus of claim 36, wherein the elements have a period between approximately 0.19λ and 0.5λ, where λ is the wavelength of the beam.

39. The apparatus of claim 36, wherein the region has a thickness of between approximately 0.001 and 0.3 μm.

40. The apparatus of claim 36, wherein the elements have a thickness of between approximately 0.04 and 0.3 μm; and wherein the elements are aluminum or silver.

41. The apparatus of claim 36, wherein the region comprises a plurality of ribs extending from the substrate.

42. The apparatus of claim 41, wherein the ribs are integral with the substrate and are formed of the same material as the substrate.

43. The apparatus of claim 41, wherein each rib is comprised of at least one layer of material which is different from the material of the substrate.

44. The apparatus of claim 43, wherein the at least one layer of material is magnesium fluoride.

45. The apparatus of claim 41, wherein the ribs have a rectangular-shaped cross section.

46. The apparatus of claim 41, wherein the ribs have a trapezoidal-shaped cross section.

47. The apparatus of claim 36, wherein the region includes a film of dielectric material.

48. The apparatus of claim 47, wherein the film of dielectric material includes magnesium fluoride.

49. The polarizer of claim 36, wherein the region comprises at least one layer of material different from the material of the substrate, and a plurality of ribs formed in and extending from the at least one layer.

50. The apparatus of claim 36, wherein the region comprises a plurality of ribs formed in and extending from the substrate, each of the plurality of ribs having at least one layer of material disposed thereon which is different from the material of the rib.

51. The apparatus of claim 36, wherein the substrate is glass, and the region comprises magnesium fluoride.

52. The apparatus of claim 36, wherein the substrate has an index of refraction of approximately 1.5, and the region has an index of refraction of approximately 1.4.

53. A broadband wire grid polarizer, the polarizer comprising:

a transparent substrate having a first surface and a refractive index;

an array of parallel, elongated elements supported by the first surface of the substrate, wherein the array satisfies the condition $0.19\lambda \leq p \leq 2\lambda$, where p is the period of the elements, and λ is the wavelength; and a region disposed between the first surface of the substrate and the elements, the region having a refractive index and a thickness between the first surface of the substrate and the elements, wherein the region satisfies the conditions $n_R < n_S$ and $0.001 \mu m \leq t_R \leq 0.3 \mu m$, where $n_R$ is the effective refractive index of the region, $n_S$ is the refractive index of the substrate, and $t_R$ is the thickness of the region between the first surface of the substrate and the elements.

54. A method for making a broadband wire grid polarizer for the visible spectrum, the method comprising:

providing a transparent substrate with a first surface and a refractive index;

forming an array of parallel elements on the first surface of the substrate, the elements defining a mask; and etching the substrate between the elements to create ribs that extend from the substrate and which define a region with a refractive index less than the refractive index of the substrate.

55. The method of claim 54, further comprising depositing a layer of dielectric film on the first surface before forming the elements; and wherein etching the substrate further includes etching the film between the elements.

56. The method of claim 54, wherein forming an array of parallel elements includes forming elements with a period between approximately 0.076 and 0.2 μm.

57. The method of claim 54, wherein etching the substrate includes etching the substrate to a depth of between approximately 0.001 and 0.3 μm.

58. A method for making a broadband wire grid polarizer for the visible spectrum, the method comprising:

providing a transparent substrate with a first surface and a refractive index;

depositing a layer of dielectric film on the first surface with a refractive index less than the refractive index of the substrate;

forming an array of parallel elements on the layer of dielectric film; and etching the layer of dielectric film between the elements to create ribs.

59. The method of claim 58, wherein etching the layer of dielectric film further includes etching the substrate between the elements.

60. The method of claim 58, wherein depositing a layer of dielectric film includes depositing a layer of magnesium fluoride.

61. A broadband wire grid polarizer for the visible spectrum, the polarizer comprising:

a substrate having an etched surface forming a plurality of ribs extending from the substrate; and an array of parallel, elongated elements disposed on the ribs.

62. The polarizer of claim 61, wherein the substrate is etched to a depth of between approximately 0.04 and 0.3 μm.

63. The polarizer of claim 61, wherein the elements have a period between approximately 0.076 and 1.4 μm.

64. A broadband wire grid polarizer for the visible spectrum, the polarizer comprising:

a transparent substrate having a first surface and a refractive index;

an array of parallel, elongated elements supported by the substrate and having a thickness of between approximately 0.04 and 0.3 µm, the elements being aluminum or silver; and a region disposed between the elements and the substrate having a refractive index which is less than the refractive index of the substrate.

65. The polarizer of claim 64, wherein the array of elements is configured to interact with the electromagnetic waves of the light in the visible spectrum to generally reflect most of the light of a first polarization and transmit most of the light of a second polarization; and wherein the array has a configuration and the elements have a size which would normally create a resonance effect in combination with the substrate within the visible spectrum in which a significant amount of the second polarization is reflected rather than transmitted; and wherein the region with a shorter refractive index than the substrate refractive index causes a shift of the normally occurring resonance effect to a lower wavelength, thereby broadening a band of visible wavelengths in which no resonance effect occurs.

66. The polarizer of claim 64, wherein the elements have a period between approximately 0.076 to 0.2 µm.

67. The polarizer of claim 64, wherein the region has a thickness of between approximately 0.001 and 0.3 µm.

68. The polarizer of claim 64, wherein the region comprises a plurality of ribs extending from the substrate.

69. The polarizer of claim 68, wherein the ribs are integral with the substrate, and are formed of the same material as the substrate.

70. The polarizer of claim 68 wherein each rib is comprised of at least one layer of material which is different from the material of the substrate.

71. The polarizer of claim 70, wherein the at least one layer of material is magnesium fluoride.

72. The polarizer of claim 68, wherein the ribs have a rectangular-shaped cross section.

73. The polarizer of claim 68, wherein the ribs have a trapezoidal-shaped cross section.

74. The polarizer of claim 64, wherein the region includes a film of dielectric material.

75. The polarizer of claim 74, wherein the film of dielectric material includes magnesium fluoride.

76. The polarizer of claim 64, wherein the region comprises at least one layer of material different from the material of the substrate, and a plurality of ribs formed in and extending from the at least one layer.

77. The polarizer of claim 64, wherein the region comprises a plurality of ribs formed in and extending from the substrate, each of the plurality of ribs having at least one layer of material disposed thereon which is different from the material of the rib.

78. The polarizer of claim 64, wherein the substrate is glass, and the region comprises magnesium fluoride.

79. The polarizer of claim 64, wherein the substrate has a refractive index of approximately 1.5, and the region has a refractive index of approximately 1.4.

80. A broadband wire grid polarizer for the visible spectrum, the polarizer comprising:

a substrate having a first surface and a refractive index;

a region on the first surface of the substrate including a plurality of ribs extending from the substrate and having a refractive index which is less than the refractive index of the substrate; and an array of parallel, elongated elements disposed on the region.

81. The polarizer of claim 80, wherein the elements have a period of between approximately 0.076 to 1.4 µm.

82. The polarizer of claim 80, wherein the region has a thickness of between approximately 0.001 and 0.3 µm.

83. The polarizer of claim 80, wherein the elements have a thickness of between approximately 0.04 and 0.3 µm; and wherein the elements are aluminum or silver.

84. The polarizer of claim 80, wherein the ribs are integral with the substrate, and are formed of the same material as the substrate.

85. The polarizer of claim 80, wherein each rib is comprised of at least one layer of material which is different from the material of the substrate.

86. The polarizer of claim 85, wherein the at least one layer of material is magnesium fluoride.

87. The polarizer of claim 80, wherein the ribs have a rectangular-shaped cross section.

88. The polarizer of claim 80, wherein the ribs have a trapezoidal-shaped cross section.

89. The polarizer of claim 80, wherein the region includes a layer of dielectric material.

90. The polarizer of claim 89, wherein the layer of dielectric material includes magnesium fluoride.

91. The polarizer of claim 80, wherein the region comprises at least one layer of material different from the material of the substrate, and a plurality of ribs formed in and extending from the at least one layer.

92. The polarizer of claim 80, wherein the region comprises a plurality of ribs formed in and extending from the substrate, each of the plurality of ribs having at least one layer of material different from the material of the rib disposed thereon.

93. The polarizer of claim 80, wherein the substrate is glass, and the region comprises magnesium fluoride.

94. The polarizer of claim 80, wherein the substrate has a refractive index of approximately 1.5, and the region has a refractive index of approximately 1.4.

95. A broadband wire grid polarizer for the visible spectrum, the polarizer comprising:

a substrate having a first surface and a refractive index;

a region on the first surface of the substrate having a refractive index which is less than the refractive index of the substrate, the region including at least one layer of material different from the material of the substrate, and a plurality of ribs formed in and extending from the film layer; and an array of parallel, elongated elements disposed on the region.

96. A broadband wire grid polarizer for the visible spectrum, the polarizer comprising:

a substrate having a first surface and a refractive index;

a region on the first surface of the substrate having a refractive index which is less than the refractive index of the substrate, and having a plurality of ribs formed in and extending from the substrate;

at least one layer of material different from the material of the ribs disposed on each of the plurality of ribs; and an array of parallel, elongated elements disposed on the region.

* * * * *

UNITED STATES PATENT AND TRADEMARK OFFICE
CERTIFICATE OF CORRECTION

PATENT NO. : 6,122,103  
DATED : September 19, 2000  
INVENTOR(S) : Perkins et al.

Page 1 of 1

It is certified that error appears in the above-identified patent and that said Letters Patent is hereby corrected as shown below:

Title page,
Item [73], The portion of the Assignee reading "Moxtech" should read -- Moxtek --.

Signed and Sealed this

Twentieth Day of November, 2001

Attest:

NICHOLAS P. GODICI
Attesting Officer  Acting Director of the United States Patent and Trademark Office